M. METCALF.
Honey Comb Frame for Bee Hives.
No. 34,157.
Patented Jan. 14, 1862.
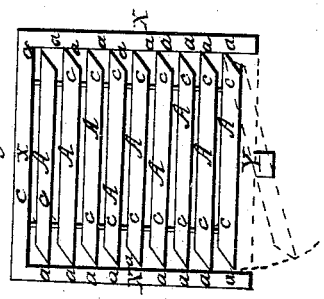
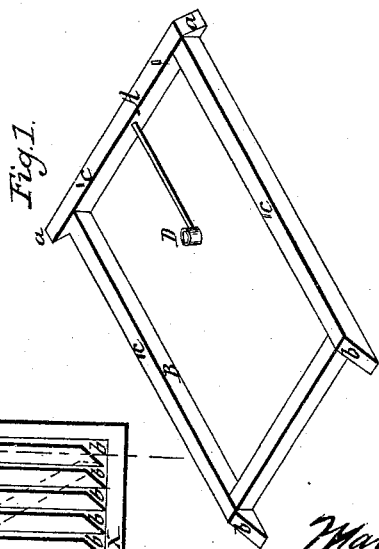
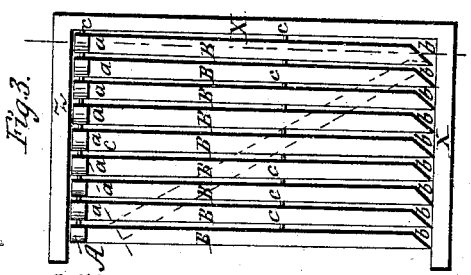
Inventor.
Martin Metcalf
by atty.
T. H. Alexander
Witnesses
J. G. C. Clayton
J. L. Clayton

UNITED STATES PATENT OFFICE.

MARTIN METCALF, OF GRAND RAPIDS, MICHIGAN.

IMPROVEMENT IN COMB-FRAMES FOR BEE-HIVES.

Specification forming part of Letters Patent No. 34,157, dated January 14, 1862.

*To all whom it may concern:*

Be it known that I, MARTIN METCALF, of Grand Rapids, Kent county, State of Michigan, have invented certain new and useful Improvements in Adjustable Frames for Bee-Hives; and I do hereby declare that the following is a full and exact description thereof, reference being had to the accompanying drawings, and to the letters of reference marked thereon.

In the drawings, Figure 1 is a perspective view showing the construction of the frame. Fig. 2 is a plan view showing the manner of arranging a set of frames in the rectangular box or hive in which they are to be used; Fig. 3, side view of frames in hive.

To enable others to make and use my invention, I will describe its construction and operation.

These adjustable frames are intended to be used in the revolving bee-hive patented to me July 30, 1861, or in any rectangular box-hive having a movable front.

A is the top bar of frame, and having its ends at $a$ beveled, as fully shown in Fig. 2; B, the side bars of frame, beveled at $b$, as is fully shown in Fig. 3; C, bottom or cross-bar of frame; D, a short tube, large enough to admit the passage of a bee, depending by a rod from the center of the top bar; X, the box or hive in which the adjustable frames are arranged; Y, the movable front of hive, to be secured by buttons; $c$, short pins on the frames for keeping them equidistant from each other; Z, cover of the hive.

In operating, the movable door or front Y being removed a frame is placed in the hive feet foremost and resting the feet on the bottom of the hive. The frame is then moved, turning on the feet as a pivot, until it assumes a perpendicular position, its pins $c$ resting against the back of the hive and keeping it parallel therewith. In a frame thus constructed it is evident that the point of support (in the beveled feet at $b$) is without the line of the center of gravity, and hence the frame will neither balance nor have a varying tendency to fall, but will have a certain tendency to fall toward the line of the center of gravity, dotted line, Fig. 3, and hence gravity will keep the first frame up against the back of the hive and each succeeding frame in the series against each preceding one. The required number of frames being placed in the box, the movable front can be replaced. Those points of the frames which touch the hive will be glued tightly by the propolis of the bees. In all other arrangements the operation of removing a frame is attended with inconveniences avoided by mine. For instance, jarring of the hive and irritation of the bees result from the tearing away of those frames which have large surfaces of contact. In order to remove a frame, we take a screw-driver or other suitable instrument and gently pry up the cover Z and pry off the movable front Y, both of which are glued to the hive by the bees. Carefully remove and place them aside, their inner surfaces upward. Then pry loose the point of contact, and taking hold of the frame at the end marked 1 gently move it toward you, turning it on the other end of the top bar marked 2 as a pivot, and then remove it edgewise from the hive. It will be seen that the frame at 1 immediately recedes from the side of the hive, and does not scrape along beside it, jarring the bees, as in other hives, and that it also readily breaks loose the other points of contact. This mode of removal is not practicable unless the top bar is beveled, as set forth, for if the top bar were square at its ends or points of contact with the hive the frame could be removed only by drawing it out parallel with the hive and scraping and jarring against the sides of the hive, thus irritating and destroying the bees.

Having thus described my invention, I claim—

Constructing the top bar A and side bars B of adjustable frames for bee-hives with the beveled ends $a\,b$, in the manner described, when used in connection with a movable front and in a rectangular box or hive.

In testimony that I claim the foregoing I hereunto set my hand.

MARTIN METCALF.

In presence of—
T. SINCLAIR,
JAMES SNOW.